United States Patent
Suess et al.

(10) Patent No.: US 12,501,184 B2
(45) Date of Patent: Dec. 16, 2025

(54) EVENT VISION SENSORS WITH DEFECT PIXEL SUPPRESSION, INCLUDING EVENT VISION SENSORS WITH IN-PIXEL DEFECT PIXEL SUPPRESSION BASED ON NOISE EVENT OCCURRENCE FIRING RATES, AND ASSOCIATED SYSTEMS, DEVICES, AND METHODS

(71) Applicant: OMNIVISION TECHNOLOGIES, INC., Santa Clara, CA (US)

(72) Inventors: Andreas Suess, San Jose, CA (US); Menghan Guo, Shanghai (CN); Shoushun Chen, Shanghai (CN)

(73) Assignee: OMNIVISION TECHNOLOGIES, INC., Santa Clara, CA (US)

( * ) Notice: Subject to any disclaimer, the term of this patent is extended or adjusted under 35 U.S.C. 154(b) by 49 days.

(21) Appl. No.: 18/483,495

(22) Filed: Oct. 9, 2023

(65) Prior Publication Data

US 2025/0119659 A1 Apr. 10, 2025

(51) Int. Cl.
*H04N 25/68* (2023.01)
*H04N 25/47* (2023.01)

(52) U.S. Cl.
CPC .............. *H04N 25/68* (2023.01); *H04N 25/47* (2023.01)

(58) Field of Classification Search
CPC ................................ H04N 25/68; H04N 25/47
See application file for complete search history.

(56) References Cited

U.S. PATENT DOCUMENTS

| | | | |
|---|---|---|---|
| 10,812,740 B2 | 10/2020 | Xu et al. | |
| 11,076,148 B2 * | 7/2021 | Sakakibara | H04N 25/78 |
| 11,153,519 B2 | 10/2021 | Niwa | |
| 2018/0262705 A1 * | 9/2018 | Park | H04N 25/772 |
| 2021/0058575 A1 | 2/2021 | Niwa | |
| 2022/0011160 A1 | 1/2022 | Dutton | |

(Continued)

OTHER PUBLICATIONS

Finateu, T. et al., "A 1280x720 Back-Illuminated Stacked Temporal Contrast Event-Based Vision Sensor with 4.86um Pixels, 1.0666GEPS Readout, Programmable Event-Rate Controller and Compressive Data-Formatting Pipeline," ISSCC 2020, Session 5, Imagers and ToF Sensors, 5.10, pp. 112-114.

(Continued)

*Primary Examiner* — Michael E Teitelbaum
(74) *Attorney, Agent, or Firm* — Dorsey & Whitney LLP

(57) ABSTRACT

Event vision sensors with defect pixel suppression (and associated methods) are disclosed herein. In one embodiment, an event vision sensor includes an array of event vision pixels and an event signal processor. The event signal processor is configured to identify event vision pixels of the array that are defective based on noise event occurrence firing rates corresponding to the event vision pixels. The noise event occurrence firing rate for each event vision pixel can be based on inter-arrival times or a noise event rate corresponding to that event vision pixel. Each event vision pixel can include internal circuitry (e.g., a memory component, such as a latch) that can, when the event vision pixel is identified as defective, be used to disable the event vision pixel from detecting events or to mask an output of the event vision pixel such that events are not read out of the event vision pixel.

21 Claims, 7 Drawing Sheets

(56) References Cited

U.S. PATENT DOCUMENTS

2023/0224558 A1* 7/2023 Miyazaki ............... H04N 23/61
                                                        348/222.1
2024/0064424 A1* 2/2024 Moeys ................... H04N 25/47

OTHER PUBLICATIONS

Son, B. et al., "A 640x480 Dynamic Vision Sensor with a 9um Pixel and 300Meps Address-Event Representation," ISSCC 2017, Session 4, Imagers, 4.1, pp. 66-68.

Li, C. et al., "A 132 by 104 10um-Pixel 250µW 1kefps Dynamic Vision Sensor with Pixel-Parallel Noise and Spatial Redundancy Suppression," 4 pages.

Angelopoulos, A. et al., "Event-Based Near-Eye Gaze Tracking Beyond 10,000 Hz," in IEEE Transactions on Visualization and Computer Graphics, vol. 27, No. 5, pp. 2577-2586.

* cited by examiner

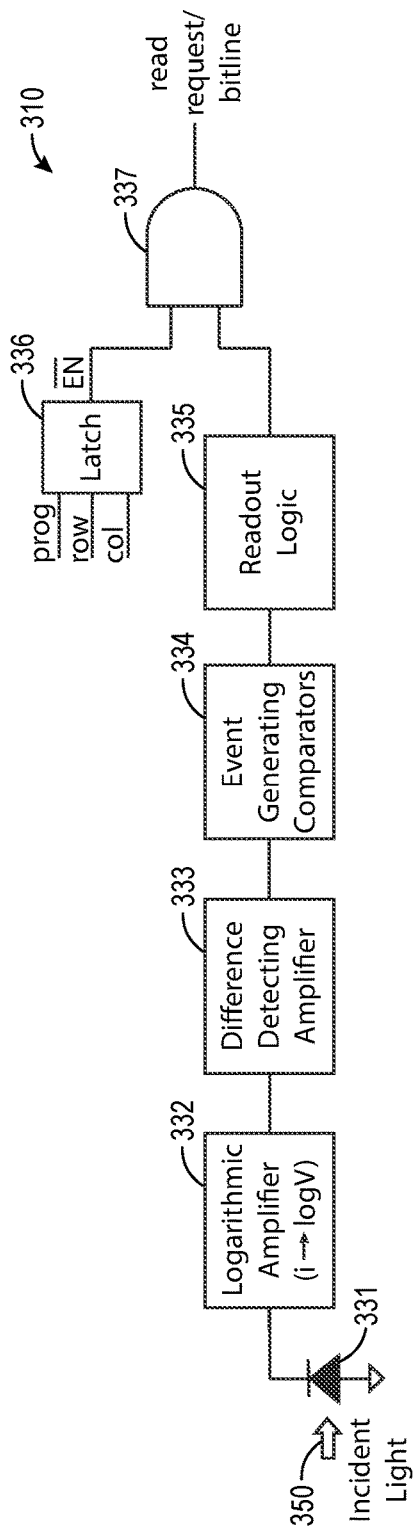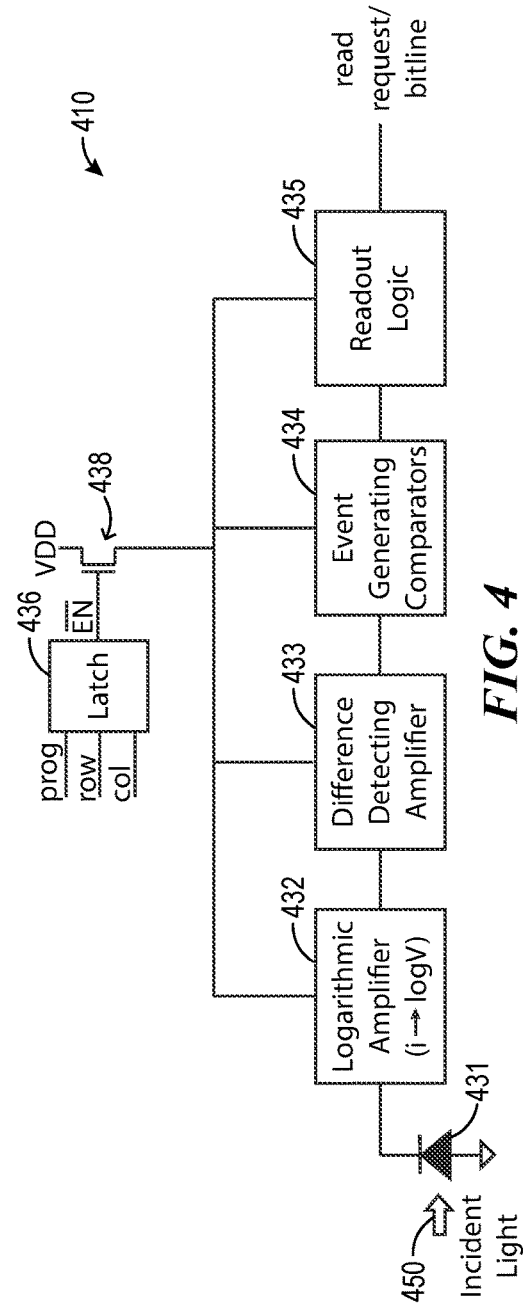

EVENT VISION SENSORS WITH DEFECT PIXEL SUPPRESSION, INCLUDING EVENT VISION SENSORS WITH IN-PIXEL DEFECT PIXEL SUPPRESSION BASED ON NOISE EVENT OCCURRENCE FIRING RATES, AND ASSOCIATED SYSTEMS, DEVICES, AND METHODS

TECHNICAL FIELD

This disclosure relates generally to event vision sensors. For example, several embodiments of the present technology relate to event vision sensors that employ defect pixel suppression, such as in-pixel defect pixel suppression based on noise event occurrence firing rates.

BACKGROUND

Image sensors have become ubiquitous and are now widely used in digital cameras, cellular phones, security cameras, as well as medical, automobile, and other applications. As image sensors are integrated into a broader range of electronic devices, it is desirable to enhance their functionality, performance metrics, and the like in as many ways as possible (e.g., resolution, power consumption, dynamic range, etc.) through both device architecture design as well as image acquisition processing.

A typical image sensor operates in response to image light from an external scene being incident upon the image sensor. The image sensor includes an array of pixels having photosensitive elements (e.g., photodiodes) that absorb a portion of the incident image light and generate image charge upon absorption of the image light. The image charge photogenerated by the pixels may be measured as analog output image signals on column bitlines that vary as a function of the incident image light. In other words, the amount of image charge generated is proportional to the intensity of the image light, which is read out as analog image signals from the column bitlines and converted to digital values to provide information that is representative of the external scene.

BRIEF DESCRIPTION OF THE DRAWINGS

Non-limiting and non-exhaustive embodiments of the present technology are described below with reference to the following figures, in which like or similar reference characters are used to refer to like or similar components throughout unless otherwise specified.

FIG. 3 is a partially schematic block diagram illustrating an event vision pixel configured in accordance with various embodiments of the present technology.

FIG. 4 is a partially schematic block diagram illustrating another event vision pixel configured in accordance with various embodiments of the present technology.

Figure 1:
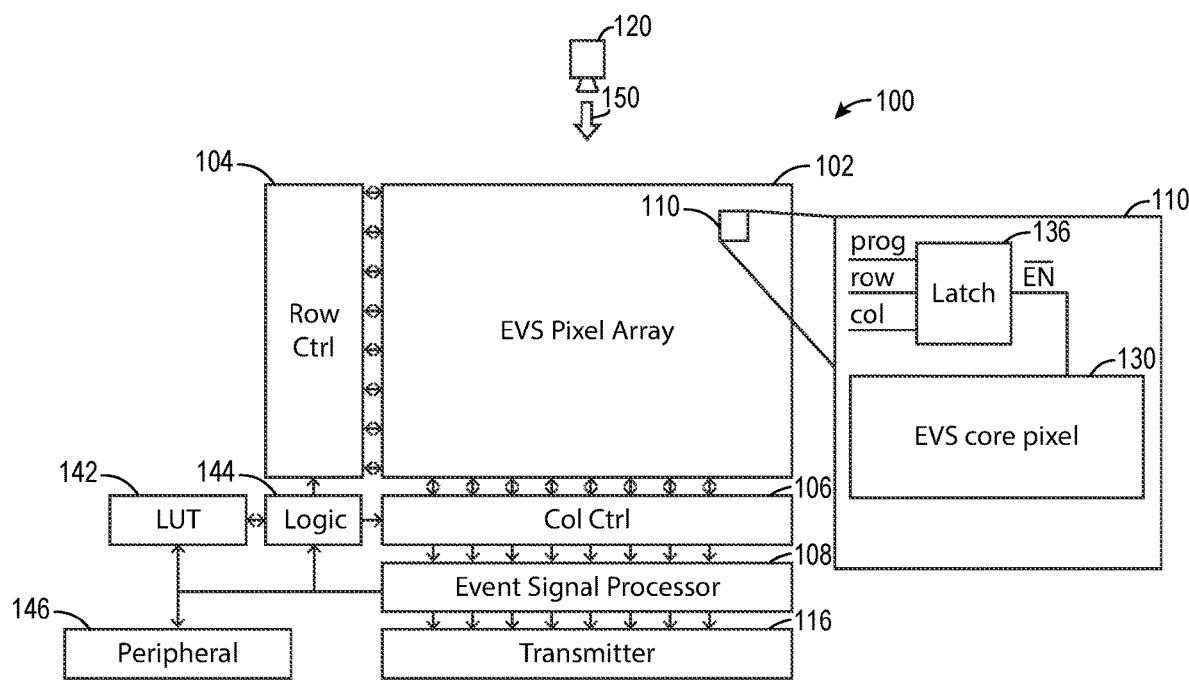
FIG. 1 is a partially schematic block diagram of an event vision sensor and an illumination source configured in accordance with various embodiments of the present technology.

Skilled artisans will appreciate that elements in the figures are illustrated for simplicity and clarity and are not necessarily drawn to scale. For example, the dimensions of some of the elements in the figures may be exaggerated relative to other elements to aid in understanding of various aspects of the present technology. In addition, common but well-understood elements or methods that are useful or necessary in a commercially feasible embodiment are often not depicted in the figures or described in detail below to avoid unnecessarily obscuring the description of various aspects of the present technology.

DETAILED DESCRIPTION

The present disclosure relates to event vision sensors. For example, several embodiments of the present technology are directed to event vision sensors that employ defect pixel suppression, such as in-pixel defect pixel suppression. In the following description, specific details are set forth to provide a thorough understanding of aspects of the present technology. One skilled in the relevant art will recognize, however, that the systems, devices, and techniques described herein can be practiced without one or more of the specific details set forth herein, or with other methods, components, materials, etc.

Reference throughout this specification to an "example" or an "embodiment" means that a particular feature, structure, or characteristic described in connection with the example or embodiment is included in at least one example or embodiment of the present technology. Thus, use of the phrases "for example," "as an example," or "an embodiment" herein are not necessarily all referring to the same example or embodiment and are not necessarily limited to the specific example or embodiment discussed. Furthermore, features, structures, or characteristics of the present technology described herein may be combined in any suitable manner to provide further examples or embodiments of the present technology.

Spatially relative terms (e.g., "beneath," "below," "over," "under," "above," "upper," "top," "bottom," "left," "right," "center," "middle," and the like) may be used herein for ease of description to describe one element's or ones feature's relationship relative to one or more other elements or features as illustrated in the figures. It will be understood that the spatially relative terms are intended to encompass different orientations of a device or system in use or operation, in addition to the orientation depicted in the figures. For example, if a device or system illustrated in the figures is rotated, turned, or flipped about a horizontal axis, elements or features described as "below" or "beneath" or "under" one or more other elements or features may then be oriented "above" the one or more other elements or features. Thus, the exemplary terms "below" and "under" are non-limiting and can encompass both an orientation of above and below. The device or system may additionally, or alternatively, be otherwise oriented (e.g., rotated ninety degrees about a vertical axis, or at other orientations) that illustrated in the figures, and the spatially relative descriptors used herein are interpreted accordingly. In addition, it will also be understood that when an element is referred to as being "between" two other elements, it can be the only element between the two other elements, or one or more intervening elements may also be present.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meaning.

A. Overview

Active pixel sensors (e.g., CMOS imaging systems) commonly employ an array of active pixels having an integration time that is globally defined. Thus, active pixels in an active pixel sensor typically have an identical integration time, and each pixel in the array is typically converted into a digital signal regardless of its content (e.g., regardless of whether there has been a change in an external scene that was captured by a pixel since the last time the pixel was read out). In other words, image data generated by active pixels in, for example, CMOS imagers are read out in frames of known size regardless of whether there are events in an external scene.

In comparison, event vision sensors (e.g., event driven sensors or dynamic vision sensors) read out a pixel and/or convert a corresponding pixel signal into a digital signal when the pixel captures a change (e.g., an event) in an external scene. In other words, pixels of an event vision sensor that do not detect a change in the external scene are not read out and/or pixel signals corresponding to such pixels are not converted into digital signals. Thus, each pixel of an event vision sensor can be independent from other pixels of the event vision sensor, and only pixels that detect a change in the external scene need be read out, and/or have their corresponding pixel signals converted into digital signals or recorded (thereby saving power). As such, an event vision sensor does not need to record an entire regular image, and therefore is not burdened with having to capture and record all of the highly redundant information of a normal image from frame to frame. As a result, an event vision sensor can be employed to detect movement or motion in an external scene (e.g., as opposed to being employed to capture/read out entire frames of images or video), while enabling (i) use of low data rates and (ii) a realization of ultra-high frame rates or speed capabilities.

When an array of event vision pixels is employed in an event vision sensor to monitor an external scene, it is rare for the event vision sensor to detect and register an isolated event (e.g., an event corresponding to a single, isolated event vision pixel in the array) that corresponds to legitimate activity in the external scene. More often, such an isolated event corresponds to noise and/or is caused by a defective event vision pixel in the array. Thus, many event vision sensors employ various techniques (e.g., encoding or compression techniques) to filter out noise event signals read out from events vision pixels. As a specific example, when a first event vision pixel of an array detects an event, some event vision sensors analyze a group of event vision pixels that includes the first event vision pixel. If the event vision sensor determines that a threshold number of event vision pixels in the group detected the event, the event detected by the first event vision pixel is classified as corresponding to legitimate activity in an external scene monitored by the event vision sensor. On the other hand, if the event vision sensor determines that less than the threshold number of event vision pixels in the group detected the event, the event detected by the first event vision pixel is classified as a noise event and/or is discarded. This technique is known as coincidence detection.

Coincidence detection works off small statistics. Stated another way, coincidence detection does not analyze or provide any insight into long term trends (e.g., coincidence detection does not provide any insight into whether it is relatively rare or common for a specific event vision pixel to detect a noise event). Thus, repeat offenders (e.g., defective pixels that routinely detect noise events) are not dealt with and continue to consume excess bandwidth of the event vision sensor to read out noise events. In addition, the small statistics approach of coincidence detection increases the likelihood of an event vision sensor classifying a legitimate event as a noise event or vice versa.

Furthermore, coincidence detection and many other conventional approaches operate on signals read out from event vision pixels of an array. Stated another way, many conventional approaches identify defective event vision pixels and/or filter out corresponding signals only after reading out noise events from the event vision pixels during normal operation of the event vision sensor. Thus, event vision sensors employing these conventional approaches typically utilize excess bandwidth of the event vision sensor during normal operation to first read out signals of defective event vision pixels (consuming excess bandwidth) before (a) the event vision pixel is identified as defective and/or (b) their corresponding signals are filtered out and/or discarded.

Given the problems discussed above, the present technology offers various solutions for identifying defective event vision pixels and disabling them or masking their output using in-pixel circuitry. For example, several embodiments of the present technology identify defective event vision pixels of an event vision sensor based on a noise event occurrence firing rate for each event vision pixel. More specifically, during one or more points along the life of an event vision sensor (e.g., during wafer testing, during powerup or initialization, after a predetermined amount of time, outside of normal operation, when the event vision sensor determines an event (legitimate and/or noise) firing rate of one or more event vision pixels exceeds a threshold, etc.), the event vision pixels can be exposed to DC illumination while the event vision sensor (e.g., an event signal processor of the event vision sensor) determines a noise event occurrence firing rate for each event vision pixel. In some embodiments, the noise event firing rate for an event vision pixel can be based on an average inter-arrival time (e.g., the average time between when the event vision pixel is reset and when the event vision pixel subsequently detects a noise event). In these and other embodiments, the noise event firing rate for an event vision pixel can be based on a number of noise events detected over a time period. Once the firing rate for an event vision pixel is obtained, the firing rate can be compared to one or more thresholds to identify whether that event vision pixel is defective (e.g., is unacceptably likely to register—or unacceptably susceptible to registering—a noise event).

When an event vision pixel is identified as defective, the event vision sensor can program a memory component (e.g., a latch) included within the event vision pixel to either disable the event vision pixel (e.g., prevent the event vision pixel from detecting events) or mask its output (e.g., prevent events detected by the event vision pixel from being output from the event vision pixel). Additionally, or alternatively, an address of the event vision pixel can be added to a lookup table maintained by the event vision sensor such that the event vision pixel can be disabled or masked each time the event vision sensor is powered on or initialized.

In this manner, the present technology offers various solutions for identifying defective event vision pixels of an event vision sensor without needing to (a) read out noise events along with legitimate events during normal operation and (b) discern whether an event should be classified as legitimate or noise. Furthermore, the present technology provides in-pixel defective pixel suppression solutions that can be leveraged to disable event vision pixels that are identified as defective and/or mask their outputs. In turn, such defective event vision pixels can be prevented from consuming excess bandwidth of the event vision sensor to read out noise events detected by those event vision pixels. As a result, the present technology is expected to reduce the number of noise events read out to an event signal processor of an event vision sensor, increase the percentage of legitimate events in events read out to the event signal processor, and/or utilize less power, in comparison to event vision sensors that lack a defective event vision pixel suppression solution and/or corresponding in-pixel circuitry.

B. Selected Embodiments of Event Vision Sensors with Defect Pixel Suppression, and Associated Systems, Devices, and Methods FIG. 1 is a partially schematic block diagram of an event vision sensor 100 (also referred to herein as an "imager") configured in accordance with various embodiments of the present technology. As shown, the event vision sensor 100 includes an array 102 of event vision pixel circuits 110 ("event vision pixels 110"), row control circuitry 104, column control circuitry 106, an event signal processor 108, a transmitter 116, a lookup table 142 ("LUT 142"), control logic 144, and peripheral circuitry 146. Also shown is an illumination source 120 configured to project light 150 onto the event vision pixel 110 of the array 102. In some embodiments, the illumination source 120 can be a component of the event vision sensor 100 or of an imaging system incorporating the event vision sensor 100. In other embodiments, the illumination source 120 can be external to the event vision sensor 100 and to an imaging system incorporating the event vision sensor 100. In still other embodiments, the illumination source 120 can be omitted.

The event vision pixels 110 are arranged in rows and columns in the array 102 (the rows and columns are not shown in FIG. 1). As discussed in greater detail below, the event vision pixels 110 are configured to detect changes (e.g., events) in light received from an external scene. To this end, each event vision pixel 110 can include (i) a photosensor, such as a photodiode, configured to photogenerate charge or photocurrent in response to incident light received from the external scene; (ii) a photocurrent-to-voltage converter coupled to the photosensor to convert photocurrent generated by the photosensor to a voltage; and (iii) a filter amplifier coupled to the photocurrent-to-voltage converter to generate a filtered and amplified signal in response to the voltage received from the photocurrent-to-voltage converter.

The event vision pixels 110 can further include a threshold comparison circuit or stage to generate and receive handshake signals in response to events asynchronously detected in incident light received from the external scene. Alternatively, a threshold comparison circuit may be included in circuitry (e.g., in the event signal processor 108) peripheral or external to the event vision pixels 110 of the array 102, such as within column read out circuitry. The photosensor, the photocurrent-to-voltage converter, the filter amplifier, and/or the threshold comparison stage of an event vision pixel 110 are collectively referred to herein as event vision sensor (EVS) core pixel circuitry 130.

As shown in FIG. 1, event vision pixels 110 configured in accordance with various embodiments of the present technology can each further include a programmable memory component 136 (illustrated as and referred to hereinafter as "latch 136") coupled to the EVS core pixel circuitry 130. The latch 136 of an event vision pixel 110 can be programmed using a program signal (prog), a row signal (row) corresponding to the event vision pixel 110, and a column signal (col) corresponding to the event vision pixel 110. More specifically, when an event vision pixel 110 of the array 102 is identified as a defective pixel (as discussed in greater detail below), an address (a row address and a column address) corresponding to the location of the event vision pixel 110 in the array 102 can be stored in the LUT 142. In turn, the control logic 144 can use the address stored in the LUT 142 to program (e.g., upon powerup or initialization of the event vision sensor 100) a latch 136 corresponding to the event vision pixel 110 to disable the event vision pixel 110 and/or mask off its output such that events detected by the event vision pixel 110 are not read out of the array 102. Various embodiments of event vision pixels 110 that incorporate a latch similar to the latch 136 are discussed in detail below with reference to FIGS. 3-6.

The row control circuitry 104 and the column control circuitry 106 of FIG. 1 are used to control the rows and columns, respectively, of the event vision pixels 110 in the array 102. For example, the row control circuitry 104 and/or the column control circuitry 106 can be configured to reset specific (e.g., individual ones or rows of) event vision pixels 110 of the array 102, and/or to read out (e.g., individual ones or rows of) event vision pixels 110 from the array 102 (e.g., along corresponding column bitlines connected to the event vision pixels 110).

Event data read out from event vision pixels 110 of the array 102 can be passed to the event signal processor 108 of the event vision sensor 100 for processing. Event data processed by the event signal processor 108 can be provided to the transmitter 116 for transmitting the event data out of the event vision sensor 100, such as to a receiver (not shown) of a corresponding imaging system. Additionally, or alternatively, all or a subset of the event data can be stored in memory (e.g., before or after being provided to the event signal processor 108 and/or the transmitter 116).

The event signal processor 108 of the event vision sensor 100 can additionally be used to identify defective event vision pixels 110 of the array 102. For example, the illumination source 120 can be used to project light 150 (e.g., DC illumination) onto the event vision pixels 110 of the array 102. In some embodiments, the light 150 can have a constant intensity or brightness (or an intensity or brightness that remains substantially unchanged or changes slowly over time). Thus, while the illumination source 120 continuously projects the light 150 onto the event vision pixel 110 of the array 102, the event vision pixels 110 should not (unless defective or subject to noise) detect events or detect events at a frequency above a threshold. The event signal processor 108 can therefore leverage the illumination source 120 to identify defective or noisy event vision pixels 110 of the array 102 and thereafter disable such pixels 110 and/or mask off their outputs. Methods of identifying defective event vision pixels 110 of the array 102 are discussed in detail below with reference to FIGS. 7-9.

1. Selected Embodiments of Event Signal Processors

Figure 2:
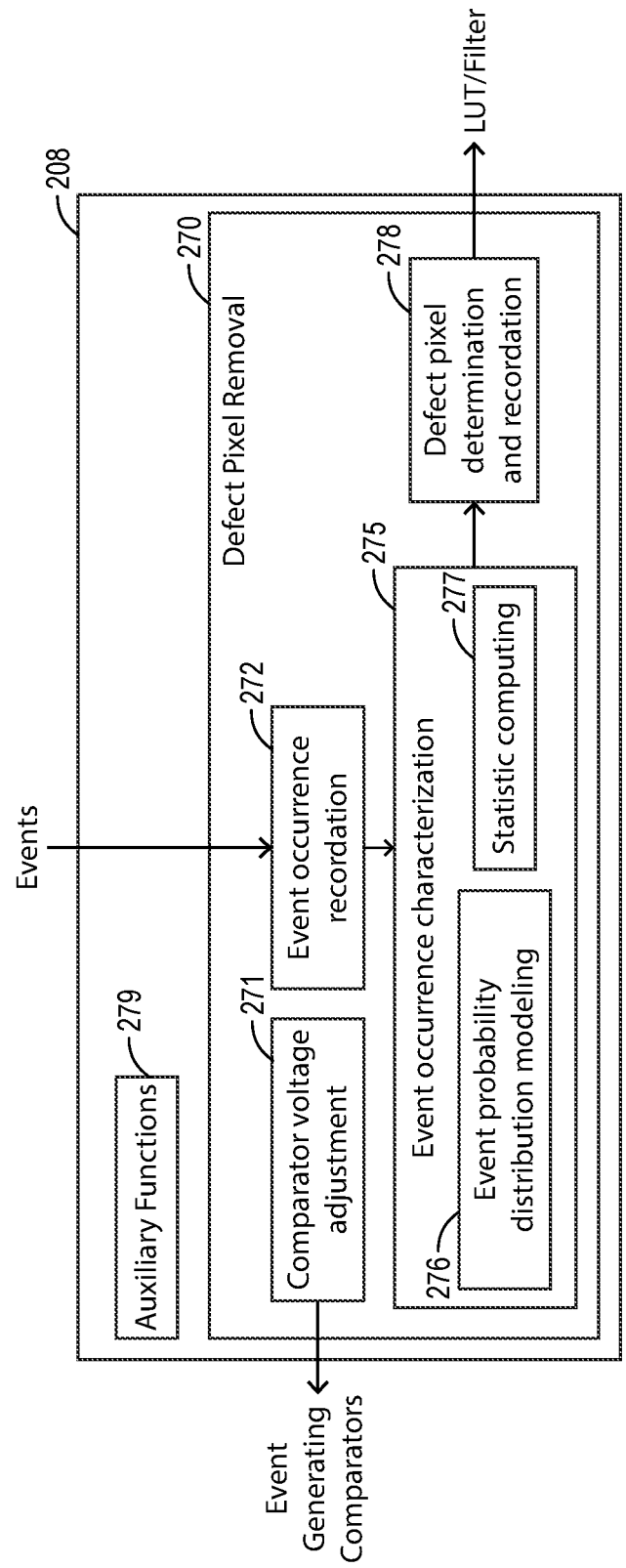
FIG. 2 is a partially schematic block diagram of an event signal processor configured in accordance with various embodiments of the present technology.

FIG. 2 is a partially schematic block diagram of an event signal processor 208 configured in accordance with various embodiments of the present technology. It is appreciated that the illustrated event signal processor 208 may be an example of the event signal processor 108 of FIG. 1, or of another event vision pixel of the present technology. As shown, the event signal processor 208 includes a defect pixel removal block 270 that includes various stages or circuits that are usable to identify and disable/mask defective event vision pixels of a corresponding event vision sensor. For example, the defect pixel removal block 270 includes a comparator voltage adjuster block 271, an event occurrence recordation block 272, an event occurrence characterization block 275, and a defect pixel determination and recordation block 278.

The comparator voltage adjuster block 271 of the event signal processor 208 can be configured to adjust comparator voltage thresholds used by event generating comparators of an event vision pixel (e.g., an event vision pixel 110 of FIG. 1). For example, the comparator voltage adjuster block 271 can be coupled to peripheral circuitry of a corresponding event vision sensor (e.g., the peripheral circuitry 146 of the event vision sensor 100 of FIG. 1). Using the peripheral circuitry, the comparator voltage adjuster block 271 can adjust a comparator threshold voltage $V_U$ used by an event generating comparator of an event vision pixel to detect UP events (e.g., changes in the brightness of light incident on a photosensor of the event vision pixel from darker to brighter that are greater than the comparator threshold voltage $V_U$). Additionally, or alternatively, the comparator voltage adjuster block 271 can adjust, using the peripheral circuitry, a comparator threshold voltage $V_D$ used by an event generating comparator of an event vision pixel to detect DOWN events (e.g., changes in the brightness of light incident on a photosensor of the event vision pixel from brighter to darker that are greater than the comparator threshold voltage $V_D$).

As discussed in greater detail below, the comparator voltage adjuster block 271 of the event signal processor 208 can be used to turn off or disable an event generating comparator of an event vision pixel while another event generating comparator is used to determine whether the event vision pixel is defective. For example, the comparator voltage adjuster block 271 can be used to set the comparator voltage threshold $V_D$ used by a down event generating comparator of an event vision pixel to $-\infty$ (or some other large negative voltage value) while the event signal processor 208 uses an up event generating comparator of the event vision pixel to determine whether the event vision pixel is defective. Setting the comparator voltage threshold $V_D$ to $-\infty$ (or some other large negative voltage value) can prevent the down event generating comparator from registering an event. Additionally, or alternatively, the comparator voltage adjuster block 271 can be used to set the comparator voltage threshold $V_U$ used by an up event generating comparator of an event vision pixels at (or sweep the comparator voltage threshold $V_U$ through a set of) one or more threshold values to, for example, enable the event occurrence characterization block 275 of the event signal processor 208 to model a probability of detecting a noise event within one or more observation windows.

The event occurrence recordation block 272 of the event signal processor 208 is configured to record noise events detected by event vision pixels. For example, the event occurrence recordation block 272 can record (i) a time stamp corresponding to when a noise event is detected and/or (ii) the location (e.g., a row address and a column address) of the event vision pixel that detected the noise event. Additionally, or alternatively, the event occurrence recordation block 272 can record a polarity or change of the noise event (e.g., indicating whether the noise event is an UP noise event or a DOWN noise event).

The event occurrence characterization block 275 can perform various computations and modeling of noise events detected by event vision pixels. For example, the event occurrence characterization block 275 can include an event probability distribution modeling block 276 that is configured to model, based at least in part on noise events recorded by the event occurrence recordation block 272, one or more probabilities of an event vision pixel detecting a noise event (e.g., at a given comparator voltage threshold) within one or more given observation windows (e.g., of varying lengths). Additionally, or alternatively, the event occurrence characterization block 275 can include a statistic computing block 277 that is configured to compute various statistics for an event vision pixel. Examples of statistics that can be computed by the statistic computing block 277 include a noise event occurrence firing rate for an event vision pixel, variance of a probability density function determined by the event probability distribution modeling block 276, higher order moments, quantiles, variability in any moments relative to a reference event vision pixel, and/or statistics relating to a group of event vision pixels (e.g., a group of event vision pixels that includes an event vision pixel and/or one or more event vision pixels falling within a certain distance away from the event vision pixel).

The defect pixel determination and recordation block 278 of the event signal processor 208 is configured to identify defective event vision pixels based on (a) statistics output from the statistic computing block 277 and (b) specified criteria or thresholds. For example, the defect pixel determination and recordation block 278 can determine that an event vision pixel is defective when a computed noise event occurrence firing rate is greater than a threshold. As another example, the defect pixel determination and recordation block 278 can determine that an event vision pixel is defective when a variance or other statistic computed by the statistic computing block 277 is greater than a threshold. Thresholds used by the defect pixel determination and recordation block 278 can be predefined (e.g., preset, predetermined). Additionally, or alternatively, thresholds used by the defect pixel determination and recordation block 278 can depend on statistics relating to one or more other (e.g., neighboring) event vision pixels. For example, the defect pixel determination and recordation block 278 can determine that an event vision pixel is defective when a noise event occurrence firing rate is greater (e.g., by a specified amount) than an average event occurrence rate corresponding to one or more neighboring event vision pixels.

When the defect pixel determination and recordation block 278 determines that an event vision pixel is defective, the defect pixel determination and recordation block 278 can store an address (e.g., a row address and a column address) corresponding to the event vision pixel in a lookup table (e.g., in the LUT 142 of FIG. 1). Additionally, or alternatively, the defect pixel determination and recordation block 278 can be coupled to control logic (e.g., the control logic 144 of FIG. 1). In these embodiments, the defect pixel determination and recordation block 278 can communicate with and/or use the control logic to disable the defective event vision pixel or mask off its output such that the defective event vision pixel is prevented from detecting events or from outputting events from the event vision pixel, respectively. For example, the defect pixel determination and recordation block 278 can instruct the control logic to program a memory component (e.g., a latch, such as the latch 136 of FIG. 1) of the defective event vison pixel via row control circuitry and/or column control circuitry of the corresponding event vision sensor. Circuitry for disabling defective event vision pixels and/or masking their outputs is discussed in greater detail below with reference to FIGS. 3-6.

As shown, the event signal processor 208 can additionally include an auxiliary functions block 279 that includes circuits or blocks for performing various auxiliary processing functions. For example, the auxiliary functions block 279 can include a segmentation classifier block and/or a shape classifier block that can be used to classify segments and shapes, respectively, of event data read out from the array. As another example, the auxiliary functions block 279 can include an optical flow estimation block that can be used to identify pixel-wise, shape-wise, or segmentation-wise motions over time and/or between consecutive readouts (e.g., using correlation-based, block-matching-based, feature-tracking-based, energy-based, and/or gradient-based optical flow estimation). In these and still other embodiments, the auxiliary functions block 279 can include a compression block to compress event data read out of the array. Additionally, or alternatively, the event signal processor 208 can include a set of one or more buffers (e.g., a set of line buffers) that are operably coupled to one or more of the blocks or circuits of the event signal processor 208 to perform various processing functions.

2. Selected Embodiments of Event Vision Pixels

FIG. 3 is a partially schematic block diagram illustrating an event vision pixel 310 configured in accordance with various embodiments of the present technology. It is appreciated that the illustrated event vision pixel 310 may be an example of one of the event vision pixels 110 included in the array 102 of FIG. 1, or of another event vision pixel of the present technology. As shown, the event vision pixel 310 includes a photosensor 331 configured to photogenerate charge or photocurrent in response to incident light 350 (e.g., received from an external scene and/or from an illumination source, such as the illumination source 120 of FIG. 1). The photosensor 331 is coupled to a logarithmic amplifier 332 that is configured to convert photocurrent generated by the photosensor 331 to a voltage. In various examples, the logarithmic amplifier 332 is configured to generate the voltage by transducing the momentary photocurrent received from the photosensor 331. A difference detecting amplifier 333 is coupled to the logarithmic amplifier 332 to generate a filtered and amplified signal in response to differences that are detected in the voltage received from the logarithmic amplifier 332. In one example, the difference detecting amplifier 333 is configured to compare the momentary log-intensity of the voltage output of the logarithmic amplifier 332 with a reference level based on a reset condition or a last event.

Event generating comparators 334 are coupled to the difference detecting amplifier 333 to compare the filtered and amplified signal received from the difference detecting amplifier 333 with thresholds to asynchronously detect events indicated in the incident light 350. In one example, the event generating comparators 334 are configured to discriminate if said signal difference is significant enough to trigger an event. In some embodiments, the event generating comparators 334 includes a first comparator (not shown) configured to detect whether the signal difference corresponds to an 'UP' event (e.g., a change in the intensity of light incident on the photosensor 331 from darker to brighter and greater than a comparator voltage threshold $V_U$). The event generating comparators 334 can further include a second comparator (not shown) configured to detect whether the signal difference corresponds to a 'DOWN' event (e.g., a change in the intensity of light incident on the photosensor 331 from brighter to darker and greater than a comparator voltage threshold $V_D$).

The event vision pixel 310 of FIG. 3 can further include scanner and readout logic 335 ("readout logic 335"). In some embodiments, the readout logic 335 can include a latch that is (a) coupled to one or more outputs of the event generating comparators 334 and (b) configured to be triggered when the event vision pixel 310 detects an event. Additionally, or alternatively, the readout logic 335 can be coupled to readout control circuitry (e.g., the row control circuitry 104 and/or the column control circuitry 106 of FIG. 1) of a corresponding event vision sensor, and can be used to request readout of the event vision pixel 310 whenever the event vision pixel 310 detects an event. In this manner, the readout logic 335 can be leveraged to ensure that the event vision pixel 310 is read out only when the event vision pixel 310 has detected an event. Stated another way, the readout logic 335 can be leveraged to ensure that the event vision pixel 310 is not read out when the event vision pixel 310 has not detected an event. When the event vision pixel 310 detects an event, the event can be read out of the event vision pixel 310 onto a column bitline (not shown) that corresponds to the event vision pixel 310.

It is appreciated therefore that an event vision sensor (e.g., the event vision sensor 100 of FIG. 1) including event vision pixels similar to the event vision pixel 310 of FIG. 3 does not need to record an entire regular image, and therefore is not burdened with having to capture and record all of the highly redundant information of a normal image from frame to frame. Rather, in various embodiments, the event vision sensor can read out and record only events. For example, the event vision sensor can read out and/or record the location of where an event is detected (e.g., the x-y coordinates of a corresponding event vision pixel in the array 102 of FIG. 1), the polarity of change (e.g., brighter or darker) in the photocurrent for that event, and/or a timing (e.g., a timestamp) corresponding to when the event occurred or was detected. In other words, the event vision sensor can be employed to detect movement or motion in an external scene (e.g., as opposed to being employed to capture/read out entire frames of images or video), thereby enabling use of low data rates and a realization of ultra-high frame rates or speed capabilities in event vision sensors of the present technology.

With continuing reference to FIG. 3, the event vision pixel 310 additionally includes a programmable memory component 336 (illustrated as and hereinafter referred to as "latch 336") and a logic gate 337. The latch 336 includes three inputs and an output. The logic gate 337 includes (a) a first input coupled to the output of the latch 336, (b) one or more second inputs coupled to one or more outputs of the readout logic 335, and (c) one or more outputs coupled to a column bitline corresponding to the event vision pixel and/or to readout control circuitry (e.g., the row control circuitry 104 and/or the column control circuitry 106 of FIG. 1). The logic gate 337 is shown as an AND gate in FIG. 3 as an example, but can be another logic gate in other embodiments of the present technology.

The latch 336 is configured to receive a program signal, a row signal, and a column signal at its inputs. As discussed in greater detail below, these signals can be used to program the latch 336 and selectively assert a mask signal $\overline{EN}$ (also referred to herein as "disable signal $\overline{EN}$") that is output from the latch 336 and fed into the logic gate 337. The row and column signals input into the latch 336 can correspond to the location of the event vision pixel 310 in an array of such pixels.

A state of the mask signal $\overline{EN}$ output from the latch 336 depends on the inputs of the latch 336. More specifically, in the illustrated example, the mask signal $\overline{EN}$ can be unasserted (e.g., can be in a first state, or "1") by default. Thus, under normal operation, the output(s) of the logic gate 337 can follow the output(s) of the readout logic 335. For example, when an event occurs in an external scene monitored by an event vision sensor that includes the event vision pixel 310, that event can be indicated in the incident light 350 received by the photosensor 331 of the event vision pixel 310 as a quick or sudden change in intensity or brightness. In other words, if the external scene is static and there is no event occurring, the brightness of incident light 350 remains substantially unchanged. As such, the photocurrent generated by the photosensor 331 remains substantially constant, and the event vision pixel 310 (unless defective) will not register an event or will not register an event very often. If, however, an event occurs (e.g., movement, changes of illumination, albedo, excitance, etc.) in the external scene, the event is indicated with an asynchronous quick or sudden change in the brightness of the incident light 350. The change in brightness can be from darker to brighter or from brighter to darker. As such, there is an asynchronous change or delta in the photocurrent generated by the photosensor 331. The change or delta in the photocurrent is converted to a voltage by the logarithmic amplifier 332, filtered and amplified by the difference detecting amplifier 333, and then detected with the event generating comparators 334. The event can be latched in the readout logic 335 until it can be read out onto the corresponding column bitline via the logic gate 337. Additionally, or alternatively, the readout logic 335 can send a request (e.g., via the logic gate 337) to readout control circuitry for the event vision pixel 310 to be read out. In turn, the event can be read out (via the logic gate 337) onto a column bitline corresponding to the event vision pixel 310.

On the other hand, in the event that the event vision pixel 310 is identified as a defective pixel, the program signal, the row signal, and the column signal input into the latch 336 can be used to program the latch 336 and assert the mask signal $\overline{EN}$. When the mask signal $\overline{EN}$ is asserted (e.g., when the mask signal $\overline{EN}$ is transitioned to a second state, or "0"), one or more outputs of the readout logic 335 can be masked via the logic gate 337. For example, when the mask signal $\overline{EN}$ is asserted, the logic gate 337 (i) can prevent a read request output from the readout logic 335 from reaching readout control circuitry corresponding to the event vision pixel 310, and/or (ii) can prevent an event detected by the event vision pixel 310 from being output onto the column bitline corresponding to the event vision pixel 310.

Masking the output of the event vision pixel 310 in the manner shown in FIG. 3 when the event vision pixel 310 is identified as a defective pixel offers several advantages. For example, events detected by the event vision pixel 310 that are most likely attributable to noise and/or defects in the event vision pixel 310 are not output from the event vision pixel 310 and therefore do not consume available bandwidth of an event vision sensor incorporating the event vision pixel 310. In addition, only the output(s) of the readout logic 335 is/are masked. Stated another way, the various analog stages (e.g., the logarithmic amplifier 332, the difference detecting amplifier 333, the event generating comparators 334, and the readout logic 335) of the event vision pixel 310 remain powered on. Thus, DC biases for each of these analog stages remain on, and the event vision pixel 310 (when identified as defective) continues to consume a relatively same amount of current as other event vision pixels of an array incorporating the event vision pixel 310 that have not been identified as defective. Therefore, even though the outputs of one or more defective event vision pixels across the array may be masked, the current consumed by event vision pixels across the array remains generally uniform. As a result, general uniformity in IR drop across the array can be maintained or observed.

FIG. 4 is a partially schematic block diagram illustrating another event vision pixel 410 configured in accordance with various embodiments of the present technology. It is appreciated that the illustrated event vision pixel 410 may be an example of one of the event vision pixels 110 included in the array 102 of FIG. 1, or of another event vision pixel of the present technology. As shown, the event vision pixel 410 includes a photosensor 431 configured to photogenerate charge or photocurrent in response to incident light 450 (e.g., received from an external scene and/or from an illumination source, such as the illumination source 120 of FIG. 1). The event vision pixel 410 additionally includes a logarithmic amplifier 432, a difference detecting amplifier 433, event generating comparators 434, and readout logic 435. The logarithmic amplifier 432, the difference detecting amplifier 433, the event generating comparators 434, and the readout logic 435 can be generally similar to the logarithmic amplifier 332, the difference detecting amplifier 333, the event generating comparators 334, and the readout logic 335, respectively, of FIG. 3. Therefore, a detailed discussion of the logarithmic amplifier 432, the difference detecting amplifier 433, the event generating comparators 434, and the readout logic 435 is omitted here for the sake of brevity.

The event vision pixel 410 additionally includes a programmable memory component 436 (illustrated as and hereinafter referred to as "latch 436"). The latch 436 is generally similar to the latch 336 of FIG. 3. Thus, a detailed discussion of the latch 436 is largely omitted here for the sake of brevity. Unlike the latch 336 of FIG. 3, however, the latch 436 of FIG. 4 is coupled to a gate of a transistor 438 that functions as a switch to selectively couple the logarithmic amplifier 432, the difference detecting amplifier 433, the event generating comparators 434, and the readout logic 435 of the event vision pixel 410 to a power supply voltage $V_{DD}$ based on a state of the disable signal $\overline{EN}$ output from the latch 436. As discussed above, the disable signal $\overline{EN}$ can be unasserted (e.g., can be in a first state, or "1") by default. Thus, under normal operation, the logarithmic amplifier 432, the difference detecting amplifier 433, the event generating comparators 434, and the readout logic 435 can be coupled to and powered by the power supply voltage $V_{DD}$ via the transistor 438. On the other hand, when the event vision pixel 410 is identified as a defective pixel, the program signal, the row signal, and the column signal input into the latch 436 can be used to program the latch 436 and assert the disable signal $\overline{EN}$. When the disable signal $\overline{EN}$ is asserted (e.g., when the disable signal $\overline{EN}$ is transitioned to a second state, or "0"), the transistor 438 can be deactivated to uncouple the logarithmic amplifier 432, the difference detecting amplifier 433, the event generating comparators 434, and the readout logic 435 of the event vision pixel 410 from the power supply voltage $V_{DD}$ such that the event vision pixel 410 is prevented from detecting events.

Preventing the event vision pixel 410 from detecting events in the manner shown in FIG. 4 when the event vision pixel 410 is identified as a defective pixel offers several advantages. For example, events (i) that are likely attributable to noise and/or defects in the event vision pixel 410 and (ii) that would likely otherwise be detected by the event vision pixel 410, are prevented from being generated or output from the event vision pixel 410 and therefore do not consume available bandwidth of an event vision sensor incorporating the event vision pixel 410. In addition, the analog stages of the event vision pixel 410 are disabled from consuming current when the event vision pixel 410 is identified as defective. As such, excess coupling on the power supply line corresponding to the power supply voltage $V_{DD}$ can be avoided while power that would otherwise be consumed by the analog stages of the event vision pixel 410 can be saved.

That said, switching off the DC biases of each of the analog stages of the event vision pixel 410 in this manner can lead to non-uniformity in current consumption of event vision pixels across an array that includes the event vision pixel 410. In other words, as a number of event vision pixels of the array are identified as defective, non-uniformity in IR drop across the array may be observed. Recognizing this concern, only a subset of the analog stages (e.g., any combination of the logarithmic amplifier, the difference detecting amplifier, the event generating comparators, and/or the readout logic that represents less than all of the analog stages) of an event vision pixel can be disabled in some embodiments of the present technology when the event vision pixel is identified as defective (e.g., such that uniformity in IR drop across the array can be largely maintained or observed.)

Figure 5:
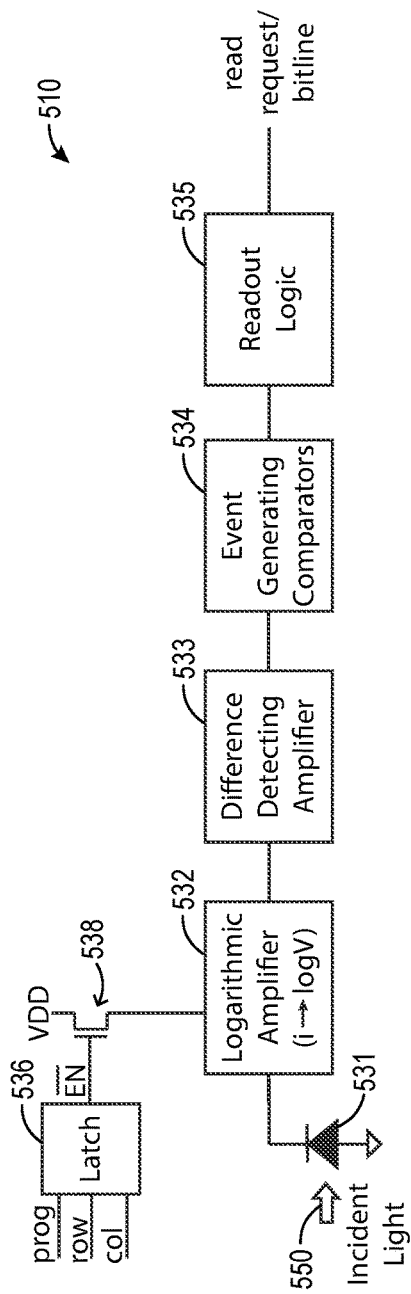
FIG. 5 is a partially schematic block diagram illustrating still another event vision pixel configured in accordance with various embodiments of the present technology.

As a specific example, consider FIG. 5 that is a partially schematic block diagram illustrating still another event vision pixel 510 configured in accordance with various embodiments of the present technology. It is appreciated that the illustrated event vision pixel 510 may be an example of one of the event vision pixels 110 included in the array 102 of FIG. 1, or of another event vision pixel of the present technology. As shown, the event vision pixel 510 includes a photosensor 531 configured to photogenerate charge or photocurrent in response to incident light 550 (e.g., received from an external scene and/or from an illumination source, such as the illumination source 120 of FIG. 1). The event vision pixel 510 additionally includes a logarithmic amplifier 532, a difference detecting amplifier 533, event generating comparators 534, and readout logic 535. The logarithmic amplifier 532, the difference detecting amplifier 533, the event generating comparators 534, and the readout logic 535 can be generally similar to the logarithmic amplifier 332, the difference detecting amplifier 333, the event generating comparators 334, and the readout logic 335, respectively, of FIG. 3. Therefore, a detailed discussion of the logarithmic amplifier 532, the difference detecting amplifier 533, the event generating comparators 534, and the readout logic 535 is omitted here for the sake of brevity.

The event vision pixel 510 additionally includes a programmable memory component 536 (illustrated as and hereinafter referred to as "latch 536"). The latch 536 is generally similar to the latch 436 of FIG. 4. Thus, a detailed discussion of the latch 536 is largely omitted here for the sake of brevity. Unlike the latch 436 of FIG. 4, however, the latch 536 of FIG. 5 is coupled to a gate of a transistor 538 that functions as a switch to selectively couple only the logarithmic amplifier 532 (as opposed to all of the analog stages) of the event vision pixel 510 to a power supply voltage $V_{DD}$ based on a state of the disable signal $\overline{EN}$ output from the latch 536. Thus, under normal operation in which the disable signal $\overline{EN}$ is unasserted (e.g., is in a first state, or "1") by default, the logarithmic amplifier 532 can be coupled to and powered by the power supply voltage $V_{DD}$ via the transistor 538. On the other hand, when the event vision pixel 510 is identified as a defective pixel, the program signal, the row signal, and the column signal input into the latch 536 can be used to program the latch 536 and assert the disable signal $\overline{EN}$. When the disable signal $\overline{EN}$ is asserted (e.g., when the disable signal $\overline{EN}$ is transitioned to a second state, or "0"), the transistor 538 can be deactivated to uncouple only the logarithmic amplifier 532 of the event vision pixel 510 from the power supply voltage $V_{DD}$. Uncoupling the logarithmic amplifier 532 from the power supply voltage $V_{DD}$ can interrupt a photocurrent path from the photosensor 531 to the difference detecting amplifier 533 such that the event vision pixel 510 is prevented from detecting events.

Preventing the event vision pixel 510 from detecting events in the manner shown in FIG. 5 when the event vision pixel 510 is identified as a defective pixel offers several advantages. For example, events (i) that are likely attributable to noise and/or defects in the event vision pixel 510 and (ii) that would likely otherwise be detected by the event vision pixel 510, are prevented from being generated or output from the event vision pixel 510 and therefore do not consume available bandwidth of an event vision sensor incorporating the event vision pixel 510. In addition, the logarithmic amplifier 532 of the event vision pixel 510 is disabled from consuming current when the event vision pixel 510 is identified as defective. As such, power that would otherwise be consumed by the logarithmic amplifier 532 of the event vision pixel 510 is saved. Furthermore, only a subset of the analog stages (here, only the logarithmic amplifier 532) of the event vision pixel 510 is disconnected from power when the event vision pixel 510 is identified as defective. Stated another way, at least some of the other analog stages (e.g., here, the difference detecting amplifier 533, the event generating comparators 534, and the readout logic 535) of the event vision pixel 510 remain powered on. Thus, DC biases for each of those other stages remain on, and the event vision pixel 510 continues to consume a relatively similar amount of current (less the reduction in current consumption attributable to disconnecting the logarithmic amplifier 532 from the power supply voltage $V_{DD}$) as it would when the event vision pixel 510 is not identified as defective. As a result, the current consumed by event vision pixels across an array can remain generally uniform even as a number of logarithmic amplifiers of defective event vision pixels across the array are disconnected from the power supply voltage $V_{DD}$. In turn, general uniformity in IR drop across the array can be largely maintained or observed.

Other methods of disabling defective event vision pixels and/or masking their outputs are of course possible and fall within the scope of the present technology. For example, a programmable memory component can be coupled to event generating comparators of an event vision pixel in such a manner that the event generating comparators can be turned on or off based on the disable signal $\overline{EN}$ output from the programmable memory component. Thus, continuing with this example, when the event vision pixel is identified as defective, the memory component can be programmed to assert the disable signal $\overline{EN}$ and turn off the comparators and/or uncouple them from a power supply voltage. In turn, the event vision pixel can be disabled from detecting events.

As another example, a programmable memory component can be coupled to a difference detecting amplifier of an event vision pixel to selectively enable the difference detecting amplifier based on the disable signal $\overline{EN}$ output from the programmable memory component. As a specific example, consider FIG. 6 that is a partially schematic block diagram illustrating yet another event vision pixel 610 configured in accordance with various embodiments of the present technology. It is appreciated that the illustrated event vision pixel 610 may be an example of one of the event vision pixels 110 included in the array 102 of FIG. 1, or of another event vision pixel of the present technology. As shown, the event vision pixel 610 includes a photosensor 631 configured to photogenerate charge or photocurrent in response to incident light 650 (e.g., received from an external scene and/or from an illumination source, such as the illumination source 120 of FIG. 1). The event vision pixel 610 additionally includes a logarithmic amplifier 632, a difference detecting amplifier 633, event generating comparators 634, and readout logic 635. The logarithmic amplifier 632, the event generating comparators 634, and the readout logic 635 can be generally similar to the logarithmic amplifier 332, the event generating comparators 334, and the readout logic 335, respectively, of FIG. 3. Therefore, a detailed discussion of the logarithmic amplifier 632, the event generating comparators 634, and the readout logic 635 is omitted here for the sake of brevity.

Figure 6:
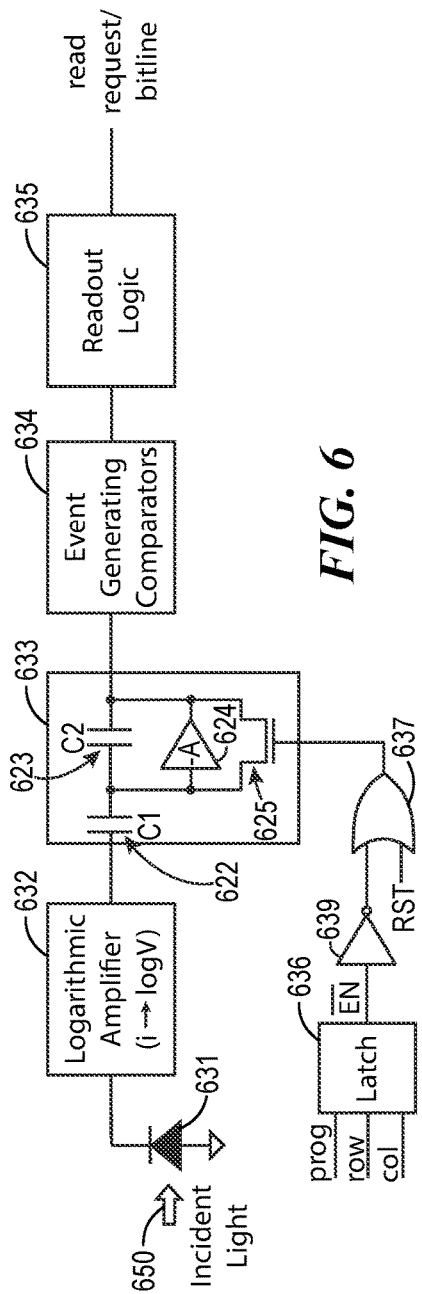
FIG. 6 is a partially schematic block diagram illustrating yet another event vision pixel configured in accordance with various embodiments of the present technology.

The difference detecting amplifier 633 is illustrated in detail in FIG. 6 for the sake of clarity and understanding. As shown, the difference detecting amplifier 633 includes a first capacitor 622, a second capacitor 623, an amplifier 624, and a reset transistor 625. The amplifier 624 includes an input (e.g., an inverting input) and an output. The first capacitor 622 is coupled between an output of the logarithmic amplifier 632 and the input of the amplifier 624, and the second capacitor 623 is coupled between the input of the amplifier 624 and the output of the amplifier 624. The reset transistor 625 is coupled between the input of the amplifier 624 and the output of the amplifier 624.

The first capacitor 622, the second capacitor 623, the amplifier 624, and the reset transistor 625 form a filter amplifier that is configured to generate a filtered and amplified signal in response to a voltage output by the logarithmic amplifier 632 of the event vision pixel 610. More specifically, the filter amplifier includes a high pass filter that is configured to filter out lower frequency components from the voltage received from the logarithmic amplifier 632. Thus, the event vision pixel 610 can ignore slow or gradual changes in the photocurrent generated by the photosensor 631 in response to the incident light 650, and can instead detect quick and sudden changes that occur in the photocurrent generated by the photosensor 631 in response to the incident light 650. Additional details regarding difference detecting circuits and associated event vision pixels are provided in U.S. patent application Ser. No. 17/875,244, which is incorporated by reference herein in its entirety.

As shown, the event vision pixel 610 also includes a programmable memory component 636 (illustrated as and hereinafter referred to as "latch 636"). The latch 636 is generally similar to the latch 336 of FIG. 3. Thus, a detailed discussion of the latch 636 is largely omitted here for the sake of brevity. An output of the latch 636 is coupled to an input of an inverter 639, and the output of the inverter 639 is coupled to an input of a logic gate 637. The logic gate 637 additionally includes (a) an input configured to receive a reset signal RST, and (b) an output coupled to a gate of the reset transistor 625. The logic gate 637 is illustrated as an OR gate in FIG. 6 as an example, but can be another logic gate in other embodiments of the present technology that may or may not include the inverter 639.

The reset transistor 625 of the event vision pixel 610 is arranged as a reset switch and is configured to selectively couple the input of the amplifier 624 to the output of the amplifier 624 based on the output of the logic gate 637. Thus, under normal operation in which the disable signal $\overline{EN}$ output from the latch 636 is unasserted (e.g., is in a first state, or "1") by default, the output of the logic gate 637 can follow the reset signal RST. In particular, when the reset signal RST is asserted, the reset transistor 625 can couple the input of the amplifier 624 to the output of the amplifier 624 to auto-zero the amplifier 624. When the reset signal RST is unasserted, the reset transistor 625 can uncouple the input of the amplifier 624 from the output of the amplifier 624.

On the other hand, when the event vision pixel 610 is identified as a defective pixel, the program signal, the row signal, and the column signal input into the latch 636 can be used to program the latch 636 and assert the disable signal $\overline{EN}$. When the disable signal $\overline{EN}$ is asserted (e.g., when the disable signal $\overline{EN}$ is transitioned to a second state, or "0"), the reset transistor 625 can be held activated to couple the input of the amplifier 624 to the output of the amplifier 624. Holding the amplifier 624 in auto-zero in this manner can disable or prevent the event vision pixel 610 from detecting events.

Preventing the event vision pixel 610 from detecting events in the manner shown in FIG. 6 when the event vision pixel 610 is identified as a defective pixel offers several advantages. For example, events (i) that are likely attributable to noise and/or defects in the event vision pixel 610 and (ii) that would likely otherwise be detected by the event vision pixel 610, are prevented from being generated or output from the event vision pixel 610 and therefore do not consume available bandwidth of an event vision sensor incorporating the event vision pixel 610. In addition, each of the analog stages of the event vision pixel 610 continue to consume static power. In other words, DC biases for each of the analog stages remain on, and the event vision pixel 610 continues to consume a relatively similar amount of current as it would when the event vision pixel 610 is not identified as defective. As a result, the current consumed by event vision pixels across an array can remain generally uniform even as a number of defective event vision pixels across the array are disabled from detecting events. In turn, general uniformity in IR drop across the array can largely be maintained or observed.

3. Associated Methods

Figure 7:
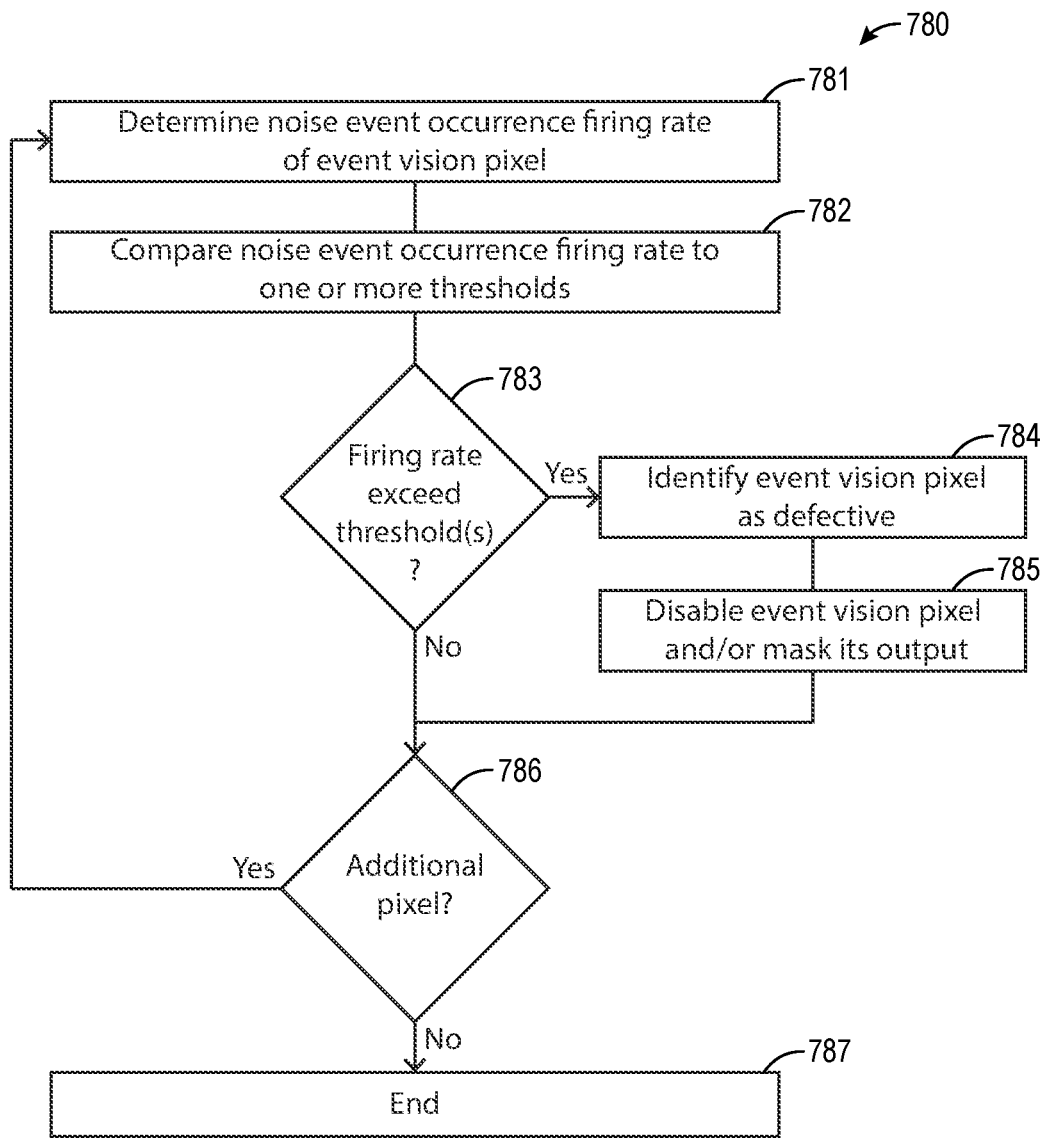
FIG. 7 is a flow diagram illustrating a method of identifying and disabling/masking defective event vision pixels of an event vision sensor in accordance with various embodiments of the present technology.

FIG. 7 is a flow diagram illustrating a method 780 of identifying and disabling/masking defective event vision pixels in accordance with various embodiments of the present technology. The method 780 is illustrated as a set of steps or blocks 781-787. All or a subset of one or more of the blocks 781-787 can be executed by various components of an event vision sensor (e.g., the event vision sensor 100 of FIG. 1). For example, all or a subset of one or more of the blocks 781-787 can be executed by (i) an event signal processor, (ii) an event vision pixel (e.g., a programmable memory component of the event vision pixel), (iii) row control circuitry, (iv) column control circuitry, (v) control logic, (vi) a lookup table, and/or (vii) peripheral circuitry. Additionally, or alternatively, all or a subset of the blocks 781-787 can be performed by an illumination source, such as the illumination source 120 of FIG. 1. Furthermore, any one or more of the blocks 781-787 can be executed in accordance with the discussion of FIGS. 1-6 above.

The method 780 of FIG. 7 begins at block 781 by determining a noise event occurrence firing rate of an event vision pixel. Determining the noise event occurrence firing rate can include determining the noise event occurrence firing rate of the event vision pixel at one or more specified comparator threshold values that is/are used in at least one event generating comparator of the event vision pixel. In these and other embodiments, determining the noise event occurrence firing rate can include determining the noise event occurrence firing rate using only one event generating comparator (e.g., an up event generating comparator or a down event generating comparator) of the event vision pixel. In these embodiments, the other event generating comparator(s) of the event vision pixel can be disabled and/or turned off. For example, assuming that the up event generating comparator of an event vision pixel is used to determine the noise event occurrence firing rate of the event vision pixel, the down event generating comparator of the event vision pixel can be turned off or the comparator threshold value used in the down event generating comparator can be set to $-\infty$ (or some other large negative voltage value). As another example, assuming that the down event generating comparator of an event vision pixel is used to determine the noise event occurrence firing rate of the event vision pixel, the up event generating comparator of the event vision pixel can be turned off or the comparator threshold value used in the up event generating comparator can be set to $\infty$ (or some other large positive voltage value). Alternatively, determining the event occurrence firing rate can include determining the event occurrence firing rate using multiple event generating comparators (e.g., both an up event generating comparator and a down event generating comparator) of the event vision pixel, or while leaving multiple event generating comparators of the event vision pixel enabled to detect noise events.

Figure 8:
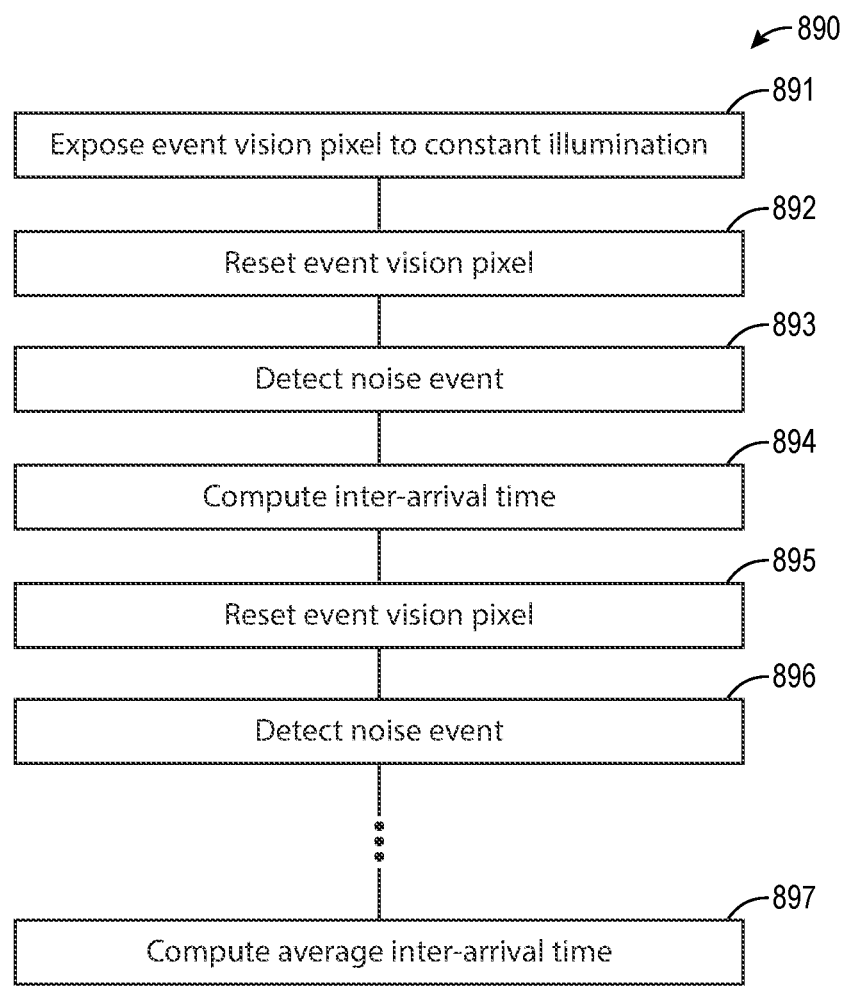
FIG. 8 is a flow diagram illustrating a method of determining a noise event occurrence firing rate of an event vision pixel in accordance with various embodiments of the present technology.

FIG. 8 is a flow diagram illustrating a method 890 for determining a noise event occurrence firing rate of an event vision pixel in accordance with various embodiments of the present technology. As shown, the method 890 begins at block 891 by exposing the event vision pixel to constant illumination. Exposing the event vision pixel to constant illumination can include exposing the event vision pixel to DC illumination, such as DC illumination projected onto the event vision pixel using an illumination source. In other embodiments, exposing the event vision pixel to constant illumination can include shuttering the event vision pixel from ambient illumination (e.g., in an external scene), such as by placing a cap over a lens of an imaging system incorporating the event vision pixel. The event vision pixel can be exposed to constant illumination for each of blocks 892-897 discussed below.

The method 890 continues at blocks 892 and 893 by resetting the event vision pixel and subsequently detecting a noise event, respectively. In some embodiments, resetting the event vision pixel can include recording a time at which the event vision pixel is reset at block 892. In these and other embodiments, detecting the noise event can include recording a time at which the event vision pixel detects the noise event at block 893.

At block 894, the method 890 continues by computing an inter-arrival time corresponding to the event vision pixel. The inter-arrival time at block 894 can be computed as the time that elapses between the time when the event vision pixel is reset at block 892 and the time that the event vision pixel detects a noise event at block 893. In some embodiments, the method 890 can limit the inter-arrival time attributed to the event vision pixel at block 894. For example, if the event vision pixel does not detect a noise event at block 893 within a threshold period of time following the time at which the event vision pixel is reset at block 892, the method 890 can proceed to block 894 and can set the inter-arrival time for the event vision pixel equivalent to the threshold period of time or to another predetermined (e.g., maximum) inter-arrival time value.

The method 890 optionally continues at blocks 895-897 by computing another inter-arrival time for the event vision pixel. More specifically, the method 890 can optionally continue by again resetting the event vision pixel at block 895, subsequently detecting a noise event at block 896, and computing another inter-arrival time corresponding to the event vision pixel at block 897 in a manner similar to block 894. For example, the inter-arrival time at block 897 can be computed as the time that elapses between the time at which the event vision pixel is reset at block 895 and the time at which the event vision pixel detects a noise event at block 896.

The method 890 can optionally continue computing one or more additional inter-arrival time following block 897. The number of inter-arrival times computed for the event vision pixel for each iteration of the routine 890 can be preset (e.g., predefined, predetermined). Additionally, or alternatively, the number of inter-arrival times computed for the event vision pixel can depend on an amount of time allotted to perform the method 890 and/or on the frequency at which the event vision pixel detects noise events.

At block 898, the method 890 continues by computing an average inter-arrival time for the event vision pixel. The average inter-arrival time for the event vision pixel can depend on the inter-arrival time(s) computed for that event vision pixel (e.g., at block 894 and/or block 897). The average inter-arrival time computed at block 898 can be determined as the noise event occurrence firing rate of the event vision pixel for block 781 of the method 780 of FIG. 7.

Figure 9:
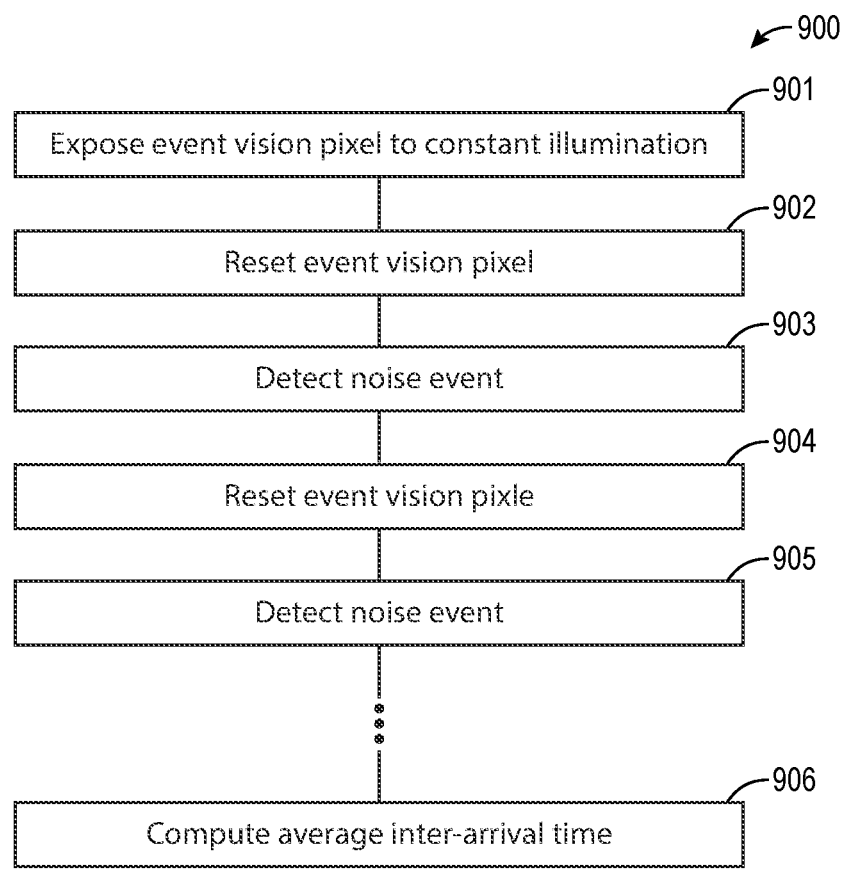
FIG. 9 is a flow diagram illustrating another method of determining a noise event occurrence firing rate of an event vision pixel in accordance with various embodiments of the present technology.

FIG. 9 is a flow diagram illustrating another method 900 for determining a noise event occurrence firing rate of an event vision pixel in accordance with various embodiments of the present technology. The method 900 begins at block 901 by exposing the event vision pixel to constant illumination. Exposing the event vision pixel to constant illumination can include exposing the event vision pixel to DC illumination, such as DC illumination projected onto the event vision pixel using an illumination source. In other embodiments, exposing the event vision pixel to constant illumination can include shuttering the event vision pixel from ambient illumination (e.g., in an external scene), such as by placing a cap over a lens of an imaging system incorporating the event vision pixel. The event vision pixel can be exposed to constant illumination for each of blocks 902-905 discussed below.

At blocks 902 and 903, the method 900 continues by resetting the event vision pixel and detecting a noise event, respectively. In some embodiments, resetting the event vision pixel at block 902 includes recording a time at which the event vision pixel is reset.

Shortly (e.g., immediately) after detecting the noise event at block 903, the method 900 continues at block 904 by again resetting the event vision pixel. Then, at block 905, the method 900 continues by again detecting a noise event. At this point, the method 900 can proceed to block 906. Alternatively, the method 900 can optionally repeat blocks 904 and 905. The number of times blocks 904 and 905 are repeated for each iteration of the method 900 can be preset (e.g., predefined, predetermined). Additionally, or alternatively, the number of times blocks 904 and 905 are repeated can depend on an amount of time allotted to perform the method 900 and/or on the frequency at which the event vision pixel detects noise events.

Similar to the method 890 of FIG. 8, the method 900 of FIG. 9 can limit an amount of time that elapses between the time at which the event vision pixel is reset and the time at which the event vision pixel subsequently detects a noise event. For example, if the event vision pixel does not detect a noise event at block 903 within a threshold period of time following the time at which the event vision pixel is reset at block 902, the method 900 can register a noise event for the event vision pixel and proceed to block 904. The method 900 can additionally, or alternatively, perform a similar process at block 905 in the event that the event vision pixel does not detect a noise event within a threshold amount of time following the time at which the event vision pixel is reset at block 904.

At block 906, the method 900 continues by calculating a noise event occurrence firing rate. In some embodiments, the noise event occurrence firing rate can be equivalent to a noise event rate, or the number of noise events detected by the event vision pixel over a cumulative amount of time the event vision pixel required to detect those noise events. For example, assuming that the event vision pixel detected noise events at blocks 903 and 905, a noise event rate for the event vision pixel can be computed as the number of noise events detected (two (2) noise events) divided by the amount of time that elapsed between the time at which the event vision pixel was reset at block 902 and the time at which the event vision pixel detected the noise event at block 905. The noise event rate computed at block 906 of the method 900 can be determined as the noise event occurrence firing rate of the event vision pixel for block 781 of the method 780 of FIG. 7.

The method 900 of FIG. 9 can be used in addition to or in lieu of the method 890 of FIG. 8 for determining an event occurrence firing rate of the event vision pixel. Alternatively, the method 890 can be used in lieu of the method 900. The method 890 has an advantage of being particularly robust against pileup, whereas the method 900 can be susceptible to pileup for high event rates. For example, referring to the method 900 of FIG. 9, the noise event occurrence firing rate calculated at block 906 of the method 900 can depend at least in part on the amount of time that elapses between the time at which the event vision pixel detects a noise event at block 903 and the time at which the event vision pixel is reset at block 904. For low event rates, this elapsed amount of time is negligible and can be ignored. But for high event rates, this elapsed amount of time can represent a large percentage of the overall amount of time that elapses between the time at which the event vision pixel is reset at block 902 and the time at which the event vision pixel detects a noise event at block 905. As such, for high event rates, the amount of time that elapses between the time at which the event vision pixel detects a noise event at block 903 and the time at which the event vision pixel is reset at block 904 can have a significant effect on the noise event occurrence firing rate calculated at block 906. This effect is referred to as "pileup." In contrast with the method 900 of FIG. 9, because the event occurrence firing rate computed at block 898 of the method 890 of FIG. 8 depends only on inter-arrival times for an event vision pixel (e.g., times that elapse between reset of an event vision pixel and subsequent detection of a noise event), the method 890 is not susceptible to pileup.

Referring again to FIG. 7, once the noise event occurrence firing rate is determined at block 781, the method 780 continues at block 782 by comparing the noise event occurrence firing rate to one or more thresholds. In some embodiments, the one or more thresholds include a predetermined firing rate threshold. The predetermined firing rate threshold can be set at a value at or above which an event vision pixel is likely defective (e.g., is unacceptably likely to register— or is unacceptably susceptible to registering—a noise event). Additionally, or alternatively, the one or more thresholds can include or be based at least in part on an average noise event occurrence firing rate of a group of event vision pixels that includes or excludes the event vision pixel of interest. For example, at block 781, the method 780 can obtain a noise event occurrence firing rate for the event vision pixel of interest and a noise event occurrence firing rate for each of one or more neighboring event vision pixels (e.g., event vision pixels within a threshold distance from the event vision pixel of interest). In turn, the method can calculate an average of the noise event occurrence firing rates and can compare the noise event occurrence firing rate of the event vision pixel of interest to the average noise event occurrence firing rate.

At block 783, the method 780 continues by determining whether the noise event occurrence firing rate exceeds the one or more thresholds from block 782. For example, when the one or more thresholds from block 782 include a predetermined firing rate threshold, the method 780 can proceed to block 784 when the noise event occurrence firing rate from 781 exceeds the predetermined firing rate threshold (block 783: Yes). As another example, when the one or more thresholds from block 782 include an average noise event occurrence firing rate (e.g., of a group of event vision pixels neighboring the event vision pixel of interest), the method 780 can proceed to block 784 when the noise event occurrence firing rate exceeds the average noise event occurrence firing rate by a more than a specified amount (block 783: Yes). On the other hand, when the method 780 determines that the noise event occurrence firing rate from block 781 does not exceed the one or more thresholds from block 782 (block 783: No), the method 780 can proceed to block 786.

At block 784, the method 780 continues by identifying the event vision pixel as defective. Identifying the event vision pixel as defective can include recording an address (e.g., a row address and/or a column address) corresponding to the event vision pixel in a lookup table. As discussed above, the lookup table can be used to later (e.g., upon powerup or initialization of an event vision sensor) identify addresses corresponding to defective event vision pixels. The method 780 can additionally, or alternatively, instruct control logic at block 784 to disable the event vision pixel and/or mask its output.

At block 785, the method 780 continues by disabling the event vision pixel and/or masking its output. In some embodiments, disabling the event vision pixel can include programming a memory component of the event vision pixel (e.g., such that one or more stages of the event vision pixel are turned off and/or uncoupled from a power supply voltage, one or more event generating comparators of the event vision pixel are turned off, a difference detecting amplifier of the event vision pixel is held at auto-zero, and/or the event vision pixel is otherwise prevented from detecting noise events). In these and other embodiments, masking the event vision pixel can include programming a memory component of the event vision pixel (e.g., such that a noise event detected by the event vision pixel is not output from the event vision pixel and/or such that a read request output by readout logic of the event vision pixel is masked).

At block 786, the method 780 determines whether there are additional event vision pixels left to analyze as being potentially defective. When the method 780 determines that there are additional event vision pixels left to analyze (block 786: Yes), the method 780 can return to block 781. Otherwise, when the method 780 determines that there are no additional event vision pixels left to analyze (block 786: No), the method 780 can proceed to block 787 to terminate.

Although the blocks 781-787 of the method 780 are discussed and illustrated in a particular order, the method 780 illustrated in FIG. 7 is not so limited. In other embodiments, the method 780 can be performed in a different order. In these and other embodiments, any of the blocks 781-787 of the method 780 can be performed before, during, and/or after any of the other blocks 781-787 of the method 780. For example, the method 780 can expose all or a subset of the event vision pixels of an array to constant illumination at the same time and thereafter determine event occurrence firing rates for those event vision pixels generally at the same time (e.g., sequentially or simultaneously). As another example, the method 780 can perform one or more of block 781-786 for multiple event vision pixels simultaneously. Moreover, a person of ordinary skill in the relevant art will recognize that the illustrated method 780 can be altered and still remain within these and other embodiments of the present technology. For example, one or more blocks 781-787 of the method 780 can be omitted and/or repeated in some embodiments. As another example, block 781 can be performed at a given comparator threshold voltage (e.g., a given comparator threshold voltage for an up event generating comparator of the event vision pixel and/or a given comparator threshold voltage for a down event generating comparator of the event vision pixel). Additionally, or alternatively, blocks 781-786 can be repeated for multiple comparator threshold voltages. For example, the method 780 repeatedly perform block 781 while stepping or sweeping through a specified set of comparator threshold voltages. In turn, the method 780 can determine whether the event vision pixel is defective based on one or more noise event occurrence firing rates determined for the event vision pixel at one or more comparator voltage thresholds.

C. Conclusion

The above detailed descriptions of embodiments of the technology are not intended to be exhaustive or to limit the technology to the precise form disclosed above. Although specific embodiments of, and examples for, the technology are described above for illustrative purposes, various equivalent modifications are possible within the scope of the technology as those skilled in the relevant art will recognize. For example, although steps are presented in a given order above, alternative embodiments may perform steps in a different order. Furthermore, the various embodiments described herein may also be combined to provide further embodiments.

From the foregoing, it will be appreciated that specific embodiments of the technology have been described herein for purposes of illustration, but well-known structures and functions have not been shown or described in detail to avoid unnecessarily obscuring the description of the embodiments of the technology. To the extent any material incorporated herein by reference conflicts with the present disclosure, the present disclosure controls. Where context permits, singular or plural terms may also include the plural or singular term, respectively. In addition, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Furthermore, as used herein, the phrase "and/or" as in "A and/or B" refers to A alone, B alone, and both A and B. Additionally, the terms "comprising," "including," "having," and "with" are used throughout to mean including at least the recited feature(s) such that any greater number of the same features and/or additional types of other features are not precluded. Moreover, as used herein, the phrases "based on," "depends on," "as a result of," and "in response to" shall not be construed as a reference to a closed set of conditions. For example, an exemplary step that is described as "based on condition A" may be based on both condition A and condition B without departing from the scope of the present disclosure. In other words, as used herein, the phrase "based on" shall be construed in the same manner as the phrase "based at least in part on" or the phrase "based at least partially on." Also, the terms "connect" and "couple" are used interchangeably herein and refer to both direct and indirect connections or couplings. For example, where the context permits, element A "connected" or "coupled" to element B can refer (i) to A directly "connected" or directly "coupled" to B and/or (ii) to A indirectly "connected" or indirectly "coupled" to B.

From the foregoing, it will also be appreciated that various modifications may be made without deviating from the disclosure or the technology. For example, one of ordinary skill in the art will understand that various components of the technology can be further divided into subcomponents, or that various components and functions of the technology may be combined and integrated. In addition, certain aspects of the technology described in the context of particular embodiments may also be combined or eliminated in other embodiments. Furthermore, although advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

What is claimed is:

1. An event vision sensor, comprising:
an array of event vision pixels arranged in rows and columns; and
an event signal processor configured to identify a defective event vision pixel of the array based at least in part on a noise event occurrence firing rate corresponding to the defective event vision pixel, wherein the noise event occurrence firing rate is based at least in part on an inter-arrival time corresponding to the defective event vision pixel, and wherein the inter-arrival time is equivalent to an amount of time that elapses between a first time at which the defective event vision pixel is reset and a second time at which the defective event vision pixel detects a noise event.

2. The event vision sensor of claim 1, wherein the defective event vision pixel includes a programmable memory component usable to disable the defective event vision pixel from detecting events or to mask an output of the defective event vision pixel.

3. The event vision sensor of claim 2, wherein the programmable memory component is usable to mask the output of the defective event vision pixel such that events detected by the defective event vision pixel are not output from the defective event vision pixel to the event signal processor.

4. The event vision sensor of claim 2, wherein:
the defective event vision pixel includes—
  a photosensor configured to generate photocurrent in response to incident light,
  a photocurrent-to-voltage converter coupled to the photosensor to convert the photocurrent to a voltage,
  a difference detecting circuit coupled to the photocurrent-to-voltage converter and configured to generate a signal in response to differences detected in the voltage received from the photocurrent-to-voltage converter, and
  at least one event generating comparator coupled to the difference detecting circuit and configured to compare the signal received from the difference detecting circuit with at least one threshold to detect events indicated in the incident light; and
the programmable memory component is usable to disable the photocurrent-to-voltage converter, the difference detecting circuit, and the at least one event generating comparator such that the defective event vision pixel is disabled from detecting events.

5. The event vision sensor of claim 2, wherein:
the defective event vision pixel includes—
  a photosensor configured to generate photocurrent in response to incident light,
  a photocurrent-to-voltage converter coupled to the photosensor to convert the photocurrent to a voltage,
  a difference detecting circuit coupled to the photocurrent-to-voltage converter and configured to generate a signal in response to differences detected in the voltage received from the photocurrent-to-voltage converter, and
  at least one event generating comparator coupled to the difference detecting circuit and configured to compare the signal received from the difference detecting circuit with at least one threshold to detect events indicated in the incident light;
the programmable memory component is usable to disable a subset of the photocurrent-to-voltage converter, the difference detecting circuit, and the at least one event generating comparator; and
the subset does not include each of the photocurrent-to-voltage converter, the difference detecting circuit, and the at least one event generating comparator.

6. The event vision sensor of claim 5, wherein:
the subset includes only the difference detecting circuit from among a set including the photocurrent-to-voltage converter, the difference detecting circuit, and the at least one event generating comparator;
the difference detecting circuit includes an amplifier; and
the programmable memory component is usable to couple an input of the amplifier to an output of the amplifier to hold the amplifier at auto-zero such that the defective event vision pixel is disabled from detecting events.

7. The event vision sensor of claim 2, further comprising control logic configured, based at least in part on the event signal processor identifying the defective event vision pixel, to program the programmable memory component of the defective event vision pixel to disable the defective event vision pixel or to mask the output of the defective event vision pixel.

8. The event vision sensor of claim 1, further comprising:
a lookup table configured to store addresses of defective event vision pixels of the array identified by the event signal processor; and
control logic configured, based at least in part on the addresses stored in the lookup table, to program programmable memory components of the defective event vision pixels upon powerup or initialization of the event vision sensor such that the defective event vision pixels are disabled or such that an output of each of the defective event vision pixels is masked.

9. The event vision sensor of claim 1, wherein:
the noise event occurrence firing rate is based at least in part on an average inter-arrival time for the defective event vision pixel; and
to identify the defective event vision pixel, the event signal processor is configured to compare the noise event occurrence firing rate to a threshold.

10. The event vision sensor of claim 9, wherein the threshold represents an average noise event occurrence firing rate corresponding to one or more event vision pixels of the array that neighbor the defective event vision pixel.

11. An event vision sensor, comprising:
an array of event vision pixels arranged in rows and columns, wherein each of the event vision pixels of the array include—
  a photosensor configured to generate photocurrent in response to incident light,
  a photocurrent-to-voltage converter coupled to the photosensor to convert the photocurrent to a voltage,
  a difference detecting circuit coupled to the photocurrent-to-voltage converter and configured to generate a signal in response to differences detected in the voltage received from the photocurrent-to-voltage converter,
  at least one event generating comparator coupled to the difference detecting circuit and configured to compare the signal received from the difference detecting circuit with at least one threshold to detect events indicated in the incident light, and
a memory component that is programmable to:
  disable a subset of the photocurrent-to-voltage converter, the difference detecting circuit, and the at least one event generating comparator of an event vision pixel such that the event vision pixel is disabled from detecting events, wherein the subset does not include each of the photocurrent-to-voltage converter, the difference detecting circuit, and the at least one event generating comparator of the event vision pixel; or
  mask an output of the event vision pixel; and
an event signal processor configured to identify defective event vision pixels of the array based at least in part on noise event occurrence firing rates corresponding to the defective event vision pixels.

12. The event vision sensor of claim 11, wherein each of the noise event occurrence firing rates is based at least in part on an inter-arrival time corresponding to a respective one of the defective event vision pixels, and wherein the inter-arrival time represents an amount of time that elapses between a first time at which the respective one of the defective event vision pixels is reset and a second time at which the respective one of the defective event vision pixels detects a noise event.

13. The event vision sensor of claim 11, wherein each of the noise event occurrence firing rates is based at least in part on a noise event rate corresponding to a respective one of the defective event vision pixels, and wherein the noise event rate represents a number of noise events detected by the respective one of the defective event vision pixels divided by a cumulative amount of time from reset that the respective one of the defective event vision pixels required to detect those noise events.

14. The event vision sensor of claim 11, further comprising:
a lookup table configured to store addresses of events vision pixels identified as defective by the event signal processor; and
control logic configured to program memory components of the defective event vision pixels based at least in part on the addresses stored to the lookup table.

15. The event vision sensor of claim 11, further comprising control logic configured to program memory components of the defective event vision pixels identified by the event signal processor.

16. A method, comprising:
identifying an event vision pixel of an event vision sensor as defective based at least in part on a noise event occurrence firing rate corresponding to the defective event vision pixel, wherein the noise event occurrence firing rate is based at least in part upon an inter-arrival time associated with the event vision pixel, and wherein the inter-arrival time represents an amount of time that elapsed between reset of the event vision pixel and a subsequent detection of a noise event; and
in response to identifying the event vision pixel as defective, preventing the event vision pixel from outputting event data.

17. The method of claim 16, further comprising determining the noise event occurrence firing rate corresponding to the defective event vision pixel, wherein determining the noise event occurrence firing rate includes:
while exposing the event vision pixel to DC illumination—
determining a first inter-arrival time associated with the event vision pixel,
determining a second inter-arrival time associated with the event vision pixel; and
determining an average inter-arrival time based at least in part on the first inter-arrival time and the second inter-arrival time.

18. The method of claim 16, wherein identifying the event vision pixel as defective includes (a) comparing the noise event occurrence firing rate to a preset threshold and (b) determining that the noise event occurrence firing rate exceeds the preset threshold.

19. The method of claim 16, wherein identifying the event vision pixel as defective includes (a) determining an average noise event occurrence firing rate based at least in part on noise event occurrence firing rates associated with one or more event vision pixels neighboring the event vision pixel in an array of the event vision sensor, (b) comparing the noise event occurrence firing rate to the average noise event occurrence firing rate, and (c) determining that the noise event occurrence firing rate exceeds the average noise event occurrence firing rate by greater than a threshold amount.

20. The method of claim 16, wherein preventing the event vision pixel from outputting the event data includes programming a memory component included within the event vision pixel such that (i) an output of the event vision pixel is masked or (ii) the event vision pixel is prevented from detecting events.

21. The method of claim 20, wherein programming the memory component includes programming the memory component such that a photocurrent-to-voltage converter of the event vision pixel, a difference detecting circuit of the event vision pixel, at least one event generating comparator of the event vision pixel, or any combination thereof is disabled.

* * * * *